US010827020B1

(12) United States Patent
Cao et al.

(10) Patent No.: US 10,827,020 B1
(45) Date of Patent: Nov. 3, 2020

(54) ASSIGNMENT OF MICROSERVICES

(71) Applicant: HEWLETT PACKARD ENTERPRISE DEVELOPMENT LP, Houston, TX (US)

(72) Inventors: Lianjie Cao, San Jose, CA (US); Puneet Sharma, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/592,560

(22) Filed: Oct. 3, 2019

(51) Int. Cl.
*G06F 13/00* (2006.01)
*H04L 29/08* (2006.01)
*H04L 12/26* (2006.01)
*H04L 29/06* (2006.01)

(52) U.S. Cl.
CPC ........ *H04L 67/2819* (2013.01); *H04L 43/045* (2013.01); *H04L 43/0817* (2013.01); *H04L 67/1012* (2013.01); *H04L 67/16* (2013.01); *H04L 67/2804* (2013.01); *H04L 67/2814* (2013.01); *H04L 67/2838* (2013.01); *H04L 67/40* (2013.01)

(58) Field of Classification Search
CPC . H04L 67/2819; H04L 67/1012; H04L 67/16; H04L 67/2804; H04L 43/0817; H04L 67/2838; H04L 67/40; H04L 43/045; H04L 67/2814
USPC .............. 709/201, 224, 229, 225, 232–235; 718/100–105
See application file for complete search history.

(56) References Cited

U.S. PATENT DOCUMENTS

| | | |
|---|---|---|
| 9,998,562 B1 | 6/2018 | Peterson et al. |
| 2018/0239647 A1* | 8/2018 | Tsai ................... H04L 41/0893 |
| 2019/0014056 A1 | 1/2019 | Sharma et al. |
| 2020/0112487 A1* | 4/2020 | Inamdar ................. H04L 67/22 |
| 2020/0127980 A1* | 4/2020 | Smith .................... G06F 21/602 |
| 2020/0133689 A1* | 4/2020 | Ferrell ................. G06F 9/44505 |
| 2020/0162380 A1* | 5/2020 | Pilkington ............ H04L 45/306 |
| 2020/0177549 A1* | 6/2020 | Barton ..................... H04L 41/14 |

OTHER PUBLICATIONS

Chowdhury, M. et al., "Vineyard: Virtual Network Embedding Algorithms with Coordinated Node and Link Mapping," IEEE, Feb. 2012, http://rboutaba.cs.uwaterloo.ca/Papers/Journals/2012/MosharafToN2012.pdf.

Jiang, J W et al., "Joint VM Placement and Routing for Data Center Traffic Engineering," Proceedings IEEE INFOCOM, IEEE. 2012, https://www.researchgate.net/profile/Sangtae_Ha/publications/254031893_Joint_VM_placement_and_routing_for_data_center_traffic_engineering/links/574b20e808ae2e0dd301a0e3/Joint-VM-placement-and-routing-for-data-center-traffic-engineering.pdf.

(Continued)

*Primary Examiner* — Kenneth R Coulter
(74) *Attorney, Agent, or Firm* — Hewlett Packard Enterprise Patent Department

(57) ABSTRACT

Example implementations relate to assigning microservices to cluster nodes. A sidecar proxy may be deployed at a data plane of a distributed service. The sidecar proxy may monitor telemetry data between microservices of the distributed service. A communication pattern may be determined from the telemetry data of the distributed service. Each microservice of the distributed service may be assigned to a cluster node based on the communication pattern.

17 Claims, 8 Drawing Sheets

(56) References Cited

OTHER PUBLICATIONS

Kuo, J-J et al., "Optimal Approximation Algorithm of Virtual Machine Placement for Data Latency Minimization in Cloud Systems," IEEE, Apr. 2014.

lianjicecao, "Webcam, webcam-dual-pod.yaml at master," GitHub, Jun. 17, 2019, https://github.com/lianjiecao/webcam/blob/master/webcam-dual-pod.yaml#L32-L41.

Meng, X. et al., "Improving the Scalability of Data Center Networks with Traffic-aware Virtual Machine Placement," Proceedings IEEE INFOCOM, IEEE, 2010, http://www.cmlab.csie.ntu.edu.tw/~freetempo/files/Traffic-aware_VM_Placement.pdf.

Nomad Enterprise, "Schedulers," retrieved online Oct. 3, 2019, https://www.nomadproject.io/docs/schedulers.html.

Tornow, D., "The Kubernetes Scheduler," Dec. 27, 2018, https://medium.com/@dominik.tomow/the-kubemetes-scheduler-cd429abac02f.

Xin, L. et al., "Lets Stay Together: Toward Traffic Aware Virtual Machine Placement in Data Centers," IEEE, 2014, https://cis.temple.edu/~wu/research/publications/Publication_files/Infocom-LiXin.pdf.

Yu, M. et al., "Rethinking Virtual Network Embedding: Substrate Support for Path Splitting and Migration," ACM SIGCOMM Computer Communication Review 38.2, 2008, pp. 17-29, https://www.princeton.edu/~chiangm/vne.pdf.

Smith, F. et al., "What Is a Service Mesh?" Apr. 3, 2018, https://www.nginx.com/blog/what-is-a-service-mesh/.

* cited by examiner

ASSIGNMENT OF MICROSERVICES

BACKGROUND

Microservice architecture replaces traditional service architecture with a smaller, more distributed architecture of decomposed components, otherwise known as microservices. Microservices may be managed, developed, and/or maintained individually, and may otherwise be loosely coupled. Each microservice may be responsible for a discrete task or function of an application, which may enable improved fault isolation and more flexible scaling. Microservices may be managed, in some instances, by an orchestration layer, which may provision, deploy, scale, migrate, and otherwise monitor the lifecycle of these microservices.

BRIEF DESCRIPTION OF THE DRAWINGS

Certain examples are described in the following detailed description and in reference to the drawings, in which.

DETAILED DESCRIPTION OF SPECIFIC EXAMPLES

A service may be an application deployed at an application layer and above, that provides software functionality that may be reused for any number of purposes. A service comprising a microservice architecture may be referred to herein as a distributed service, which, unlike a traditional service architecture, may include any number of microservices, and specifically microservice instances, that together support the service. Each microservice may be responsible for a discrete task or function of the service as a whole. A microservice architecture introduces more flexibility and scalability for service development and management than a traditional architecture. A microservice architecture may further leverage lightweight virtualization technologies, e.g. containers, to accelerate service development and enable more granular service management. For instance, a microservice may include any number of container groups including resources that may be activated, de-activated, or otherwise managed in isolation.

In some examples, microservices may be co-located at a like region, datacenter, physical compute resource, e.g. server, compute node, etc. Microservices that are not co-located may otherwise be in communication over a physical and/or virtual network. For example, microservices may communicate with each other via Representational State Transfer (REST) Application Programming Interfaces (APIs), Remote Procedure Call (RPC), or message queues.

While a microservice architecture introduces greater flexibility and service development and management, microservice architecture may also increase heterogeneity and may complicate service communication patterns. Microservices of a distributed architecture, if not properly placed, may experience an increase in latency, data loss, and/or other network issues that may otherwise negatively affect the performance of a service. For example, a group of microservices in frequent and/or synchronous communication, if placed on different hosts as opposed to the same host, may decrease the performance of a service due to additional communication delays.

Figure 1:
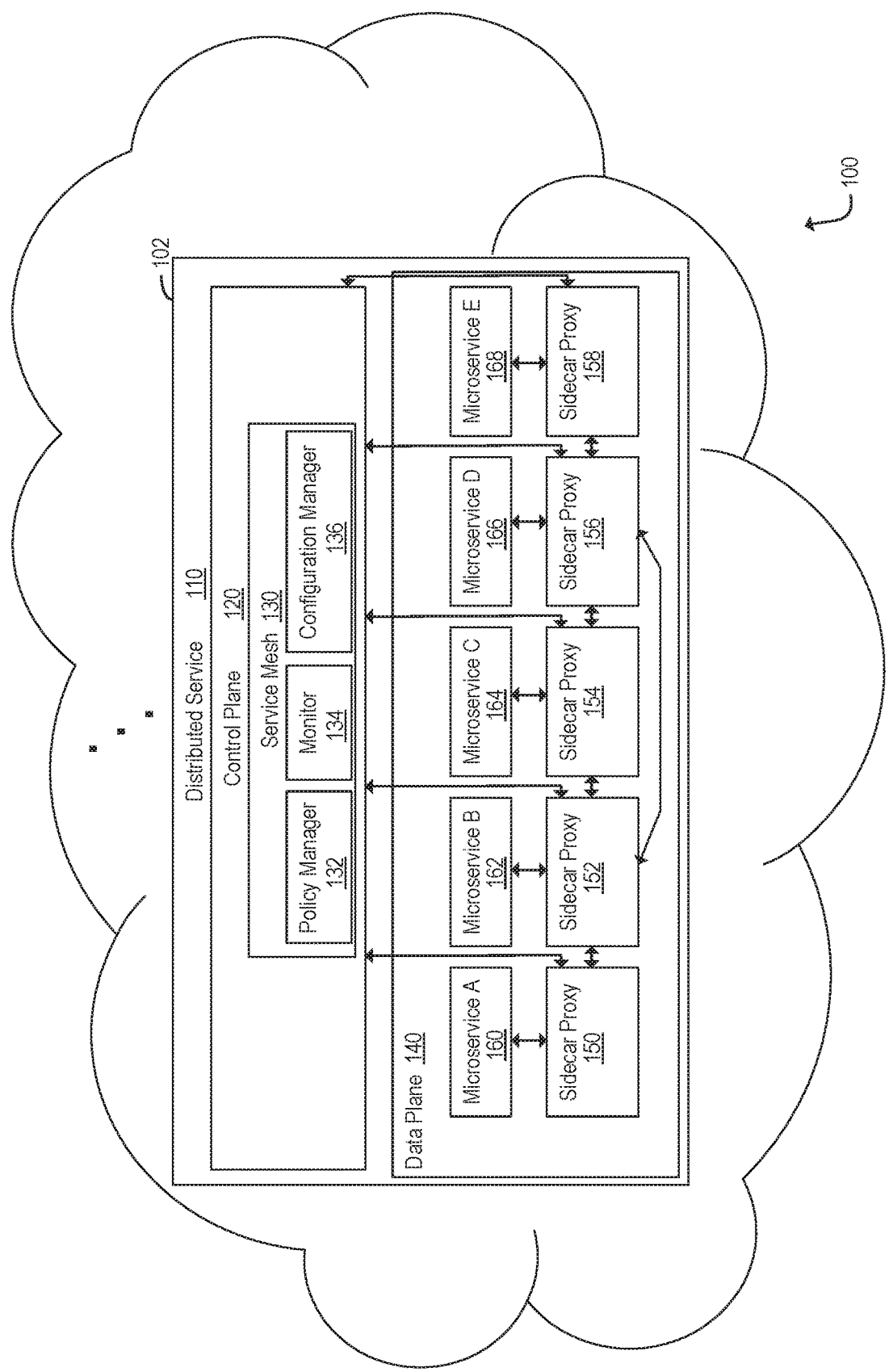
FIG. 1 is a block diagram of an example distributed service including sidecar proxies for monitoring telemetry data between microservice instances.

To make efficient microservice placement decisions, sidecar proxies may be implemented at a data plane of the distributed service. The sidecar proxies may be deployed at an infrastructure layer of the data plane, known herein as a service mesh, for handling service-to-service communications of the distributed service. Sidecar proxies, as will further be described below, may monitor telemetry data between microservices of a distributed service. FIG. 1 is a block diagram 100 representing a distributed service 110 including sidecar proxies, 150-158 respectively, for monitoring telemetry data between microservice instances, e.g. microservice instances 160-168. In an example, the distributed service 110 may be deployed at a network 102. Microservice instances 160-168 may be, for example, a group of containers that enable the virtual packaging and isolation of a resource for supporting the microservice. While, for purposes of clarity and conciseness, example distributed service 110 includes five example microservice instances 160-168, distributed service 110 may include any number of microservices.

A container of a microservice instance may be a logical entity in which resource blocks may be stored. A container may share access to an Operating System (OS) kernel and may be placed in a Virtual Machine (VM) or Physical Machine (PM). One or more containers may be grouped for co-location and/or co-scheduling. For example, containers of a given container group may be tightly coupled, such that the containers within a container group may be of a same logical host, i.e. a same physical or virtual machine. Containers of a like container group may also share an address.

Containers, and specifically container groups, may be, deployed, scaled, and otherwise managed via a container orchestration platform. By way of non-limiting examples, a container orchestration platform may be at least one of Docker Swarm®, Kubernetes®, Cloud Foundry® Diego, Apache® Mesos™, and the like. A container orchestration platform may enable a user to co-locate containers to support a like microservice. For example, a user may manually modify a job configuration specification to specify particular container locations.

Containers may be managed and otherwise accessible via an infrastructure elements, such as a load balancer, cluster IP service, node port service, etc. The infrastructure element may be part of an infrastructure layer dedicated to distributed service 110, known as a service mesh 130, for handling service-to-service communications. Example service mesh 130 may, in some examples, provide reconfigurable traffic management at a control plane 120 of the distributed service.

Example sidecar proxies 150-158 may be deployed at data plane 140. While, for purposes of clarity and conciseness, example distributed service 110 includes five example sidecar proxies 150-158, distributed service may include any number of deployed sidecar proxies. Each of sidecar proxies 150-158 may collect routing and/or telemetry data derived from communications between service mesh 130 and microservice instances 160-168 respectively, and/or from communications between microservice instances. A communication may be monitored and collected by any of sidecar proxies 150-158 at control plane 120 or data plane 140 depending on the nature of the communication, e.g. a data transfer, control function, etc. In an example implementation, each of sidecar proxies 150-158 may transmit the collected routing and/or telemetry data to monitor 134 of service mesh 130. Sidecar proxies 150-158 may, for example, be configured by configuration manager 136 of control plane 120 and otherwise managed by policy manager 132 of control plane 120. Depending on the configuration, example sidecar proxies 150-158 may provide any number of additional functionalities for microservice instances 160-168 respectively, including health checking, load balancing, routing, etc.

Figure 2:
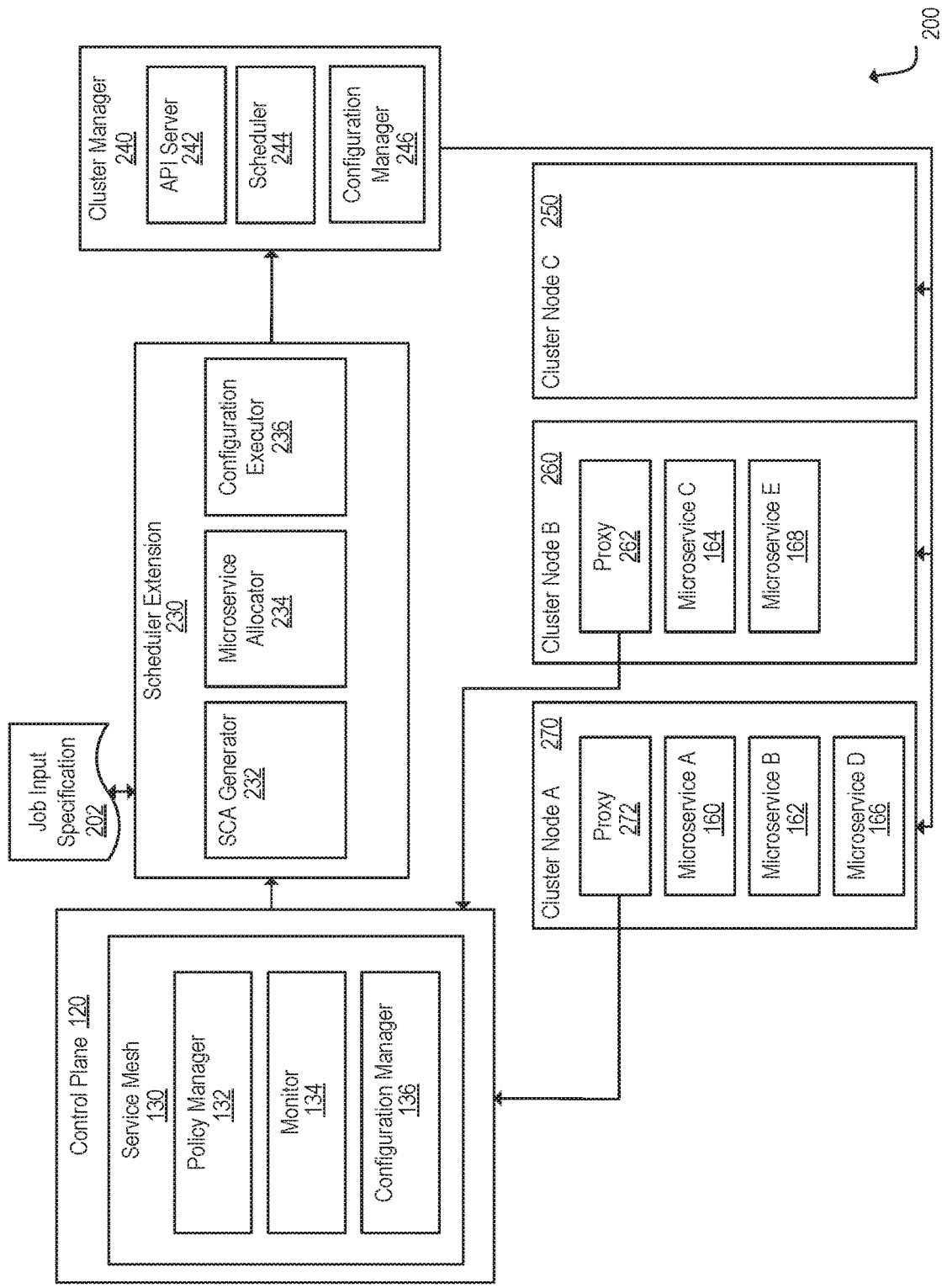
FIG. 2 is a block diagram of an example system for co-locating microservices of a distributed service.

FIG. 2 is a block diagram of an example system 200 for co-locating microservices of a distributed service. FIG. 2 may incorporate some of the architecture described in FIG. 1 above, including control plane 120, and service mesh 130 including policy manager 132, monitor 134, and configuration manager 136. System 200 may further include example microservices 160-168 for co-location. Example sidecar proxies 262 and 272 may be deployed at system 200, and, while two example sidecar proxies are illustrated for purposes of clarity and conciseness, any number of sidecar proxies may be implemented as otherwise deployed. For example, while sidecar proxy 272 is illustrated and described as a single entity at cluster node 270 for purposes of clarity and conciseness, sidecar proxy 272 may include multiple sidecar proxies embedded at microservice 160, 162 and/or 166. Similarly, while sidecar proxy 262 is illustrated and described as a single entity at cluster node 260 for purposes of clarity and conciseness, sidecar proxy 262 may include multiple sidecar proxies embedded at microservice 164 and/or 168.

As described above with respect to FIG. 1, sidecar proxies 262 and 272 may be configured by configuration manager 136 of control plane 120 and otherwise managed by policy manager 132. Proxies 262 and 272 may collect routing and/or telemetry data derived from communications between service mesh 130 and microservice instances 160-168 respectively, and/or from communications between microservice instances 160-168. Specifically, each of sidecar proxies 150-158 may monitor routing and/or telemetry data of microservice instances 160-168 and may transmit the routing and/or telemetry data to monitor 134 of service mesh 130.

Monitor 134 may, in an example, transmit the collected routing and/or telemetry data to scheduler extension 230. Scheduler extension 230 may include a Service Communication Abstraction (SCA) graph generator 232, a microservice allocator 234, and a configuration executor 236 for co-locating microservices. Scheduler extension 230 and/or any of SCA generator 232, microservice allocator 234, and configuration executor 236 may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory computer readable storage medium and the hardware for the engines may include at least one processing resource to execute those instructions. In some examples, the hardware may also include other electronic circuitry to at least partially implement at least one of the engine(s). In some examples, the at least one computer readable medium may store instructions that, when executed by the at least one processing resource, at least partially implement some or all of the engine(s). In such examples, a computing device may include the at least one computer readable storage medium storing the instructions and the at least one processing resource to execute the instructions. In other examples, the engine may be implemented by electronic circuitry.

Scheduler extension 230 may be implemented as part of a cluster manager scheduler, such as scheduler 244 of cluster manager 240, as will be described in greater detail below. In another example implementation, scheduler extension may be an extension of cluster manager 240, and/or may otherwise be implemented as a physical component separate from, but otherwise in communication with cluster manager 240. In other words, scheduler extension 230 may be implemented as part of a scheduler of an existing container orchestration platform, and/or scheduler extension 230 may be implemented as a third-party plugin that may generate or otherwise update job configuration specifications for the container orchestration platform.

Scheduler extension 230 may receive, and otherwise collect microservice data of a job input specification 202 of a distributed service, e.g. via cluster manager 240. In some examples, job input specification 202 may be fed directly to scheduler extension 230. Job input specification 202 may include specification and/or configuration information for the microservices to support the distributed service, e.g. microservices 160-168. For instance, job input specification 202 may include the computational resources consumed by each of microservices 160-168, e.g. CPU, memory, etc. SCA generator 232 may further receive, from service mesh 130, the routing and/or telemetry data collected by proxies 262 and 272.

Figure 3A:
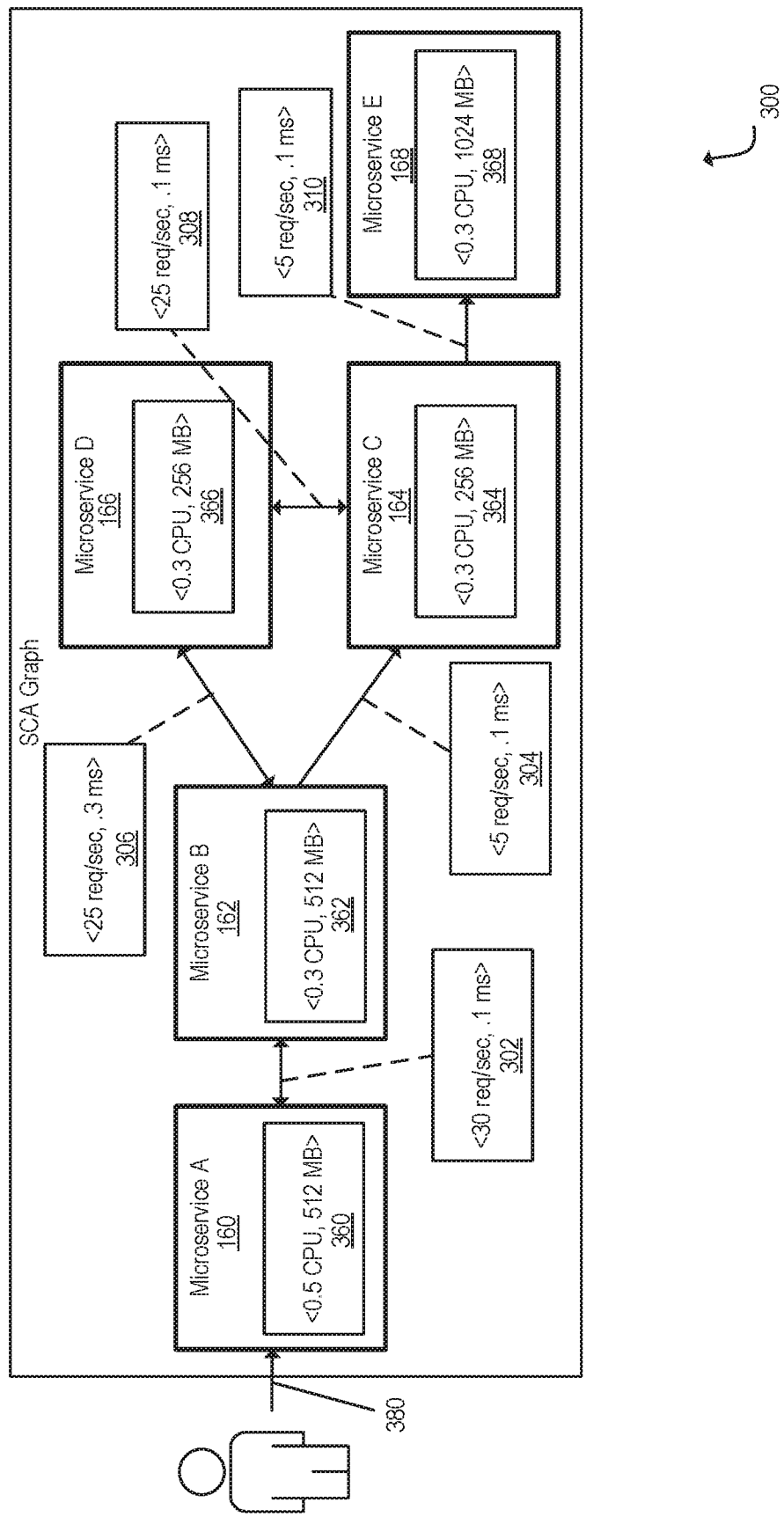
FIGS. 3A and 3B are block diagrams illustrating an example Service Communication Abstraction (SCA) graph.

SCA generator 232 may, in an example implementation, generate a Service Communication Abstraction (SCA) graph from the specification and/or configuration information of microservices 160-168 and the routing and/or telemetry data collected by proxies 262 and 272. FIG. 3A is a block diagram illustrating an example SCA graph 300 generated by SCA generator 232. Each microservice retrieved from job input specification 202 may be represented as a vertex of SCA graph 300. In this illustrated example, each of microservices 160-168 may be represented as a vertex of SCA graph 300.

Specifications of microservices 160-168, including the CPU and memory consumption of each of microservices 160-168, may be assigned to each corresponding vertex as a weight. For example, microservice 160 may include a resource weight 360 of 0.5 CPU (50% of a CPU core) and 512 MB, microservice 162 may include a resource weight 362 of 0.3 CPU and 512 MB, microservice 164 may include a resource weight 364 of 0.3 CPU and 256 MB, microservice 166 may include a resource weight 366 of 0.3 CPU and 256 MB, and microservice 168 may include a resource weight 368 of 0.3 CPU and 1024 MB.

SCA generator 232 may, in an example implementation, map routing and/or telemetry data received by scheduler extension 230 to SCA graph 300. For example, direct communication between microservices may be represented as an edge on SCA graph 300. Each edge, may, in some example implementations, be assigned an edge weight representative of telemetry data, including a latency, frequency of communication, etc., between respective microservices. Each edge weight may correspond to a single routing and/or telemetry variable, or a combination of different variables.

Referring to example SCA graph 300, edge weight 302 may correspond to an average frequency of communication of 30 requests per second between microservice 160 and microservice 162, and an average latency of communication of 0.1 milliseconds. Edge weight 304 may correspond to an average frequency of communication between microservice 162 and microservice 164 of 5 requests per second and an average latency of 0.1 milliseconds. Edge weight 306 may correspond to a frequency of communication between microservice 162 and microservice 164 of 5 requests per second and an average latency of 0.1 milliseconds. Edge weight 308 may correspond to a frequency of communication between microservice 164 and microservice 166 of 25 requests per second and an average latency of 0.1 milliseconds. Edge weight 310 may correspond to a frequency of communication between microservice 164 and microservice 168 of 5 requests per second and an average latency of 0.1 milliseconds. Accordingly, SCA graph 300 maps a communication pattern of an input traffic distribution 380 between microservices of a distributed service.

The SCA graph may, in some examples, be periodically updated by SCA generator 232. For instance, real-time traffic intensity and/or latency data between two microservices may be continuously monitored and collected, and a statistical distribution of the traffic composition may be derived from the data. Each vertex and weight and/or edge weight may be continually updated according to the derived distribution. In some example implementations, SCA generator 232 may generate an SCA graph for each workload type of the distributed service. In another example implementation, SCA generator 232 may generate an SCA graph that is representative of telemetry data for a combination of different types of workloads.

For instance, a stable statistical distribution of the routing and/or telemetry data may be derived from traffic data monitored over a period of time. A snapshot of an SCA for a stable statistical distribution of the input traffic may be taken and may be updated periodically. In an example, the statistical distribution may be considered stable where a variation of a normalized histogram of the routing and/or telemetry data is below a threshold for a predefined period of time. In an example implementation, a snapshot may be taken and the SCA graph updated where the stable input traffic distribution varies, or where the input job specification is updated, e.g. due to a software update, service scaling, etc.

Turning back to FIG. 2, the snapshot of the SCA for the stable statistical distribution may be passed from SCA generator 232 to microservice allocator 234. Microservice allocator 234 may be configured to partition the SCA graph generated by SCA generator 232. In an example, microservice allocator 234 may partition the SCA graph such that each partition, also referred to herein as "subgraphs," includes at least one vertex, or in other words, at least one microservice. In an example, the SCA graph is partitioned such that the total weight of edges, e.g. edge weights 302-310, across different subgraphs, is minimized. Put another way, the SCA graph may be partitioned based on a relative communication pattern strength between microservices of a partition as compared to other microservices not of the subgraph. In an example, the communication pattern strength between microservices may be a function of a rate of traffic and latency of communication between the microservices. The function may specifically quantify the rate of traffic and latency of communication as a stable statistical distribution of traffic over a predetermined time as further described herein.

As will be described in greater detail below, microservices of a like partition may be physically co-located on a cluster node. Microservices having a greater frequency of communication and/or a greater latency of communication may be co-located on a like cluster node to minimize latency and to otherwise accommodate efficient data transfer. In an example implementation, the SCA graph is partitioned such that microservices 160-168 are allocated to a minimum number of available cluster nodes.

Figure 3B:
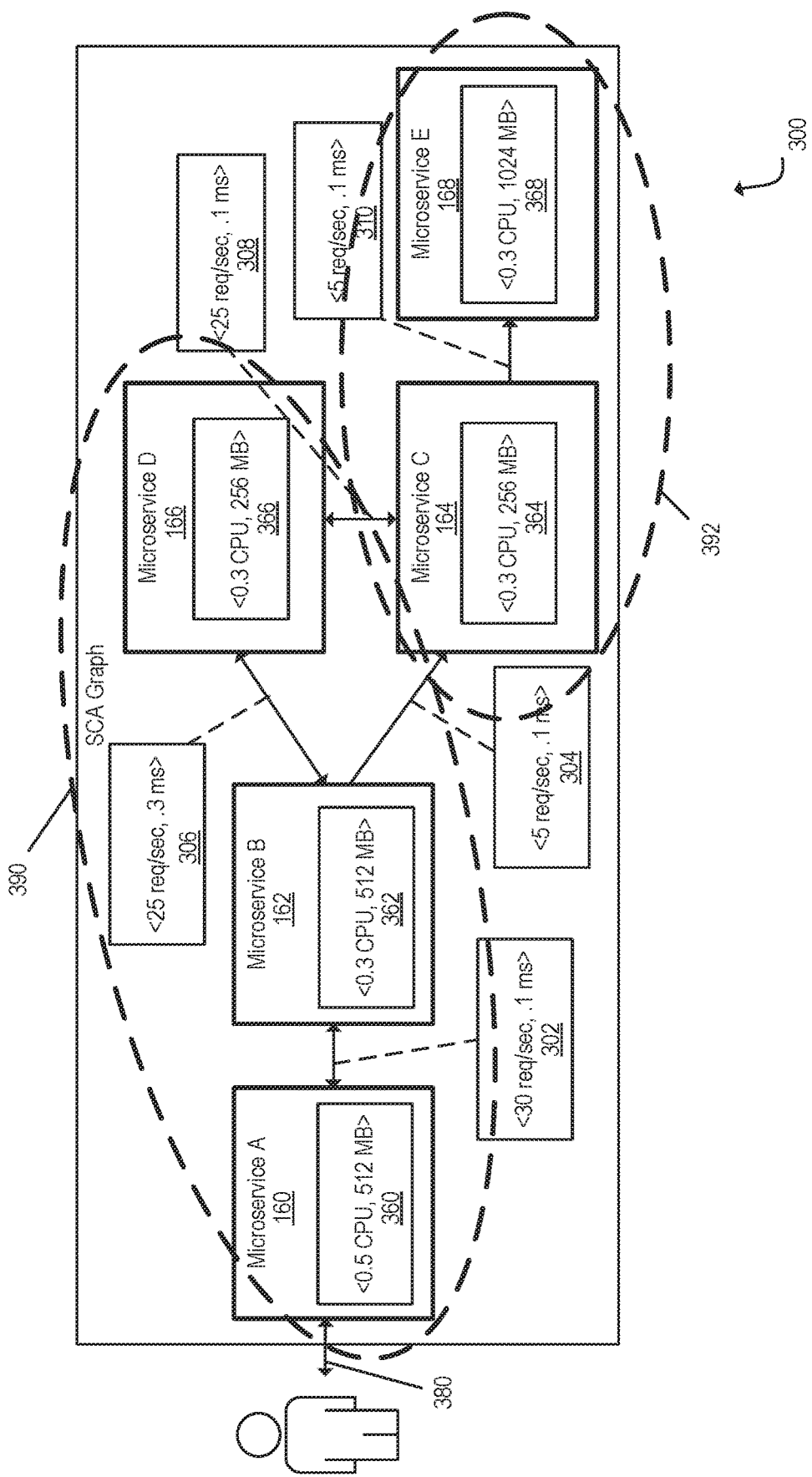

FIG. 3B is a block diagram illustrating the example SCA graph 300 of FIG. 3A partitioned by microservice allocator 234. As an illustrated example, microservice allocator 234 may partition SCA graph 300 into two partitions; partition 390, including microservices 160, 162, and 166; and partition 392, including microservices 164 and 168. Although two example partitions are illustrated for purposes of clarity and conciseness, microservice allocator 234 may partition SCA graph 300 into any number of partitions depending on the number of cluster nodes to which the microservices are to be allocated. Additionally, any number of microservices may be assigned to a partition. In this example, edge weights 304 and 308 are "cut" such that they span across partitions. As described above, SCA graph 300 may be partitioned such that the total weight of edges across different partitions is minimized.

Microservice allocator 234 may further assign each microservice of a partition to a cluster node. In an example implementation, microservice allocator 234 may adjust the SCA graph and otherwise re-assign each microservice to a cluster node responsive to a change in the communication pattern of the microservices.

In an example implementation, each microservice of a same partition may be assigned to a same cluster node. As illustrated in FIG. 3B, microservices 160, 162, and 166 are included in partition 390, and microservices 164 and 168 are included in partition 392. Turning to FIG. 2, microservices 160, 162, and 166 are assigned, e.g. by microservice allocator 234, to cluster node 270. Similarly, microservices 164 and 168 may be assigned to cluster node 260. In an example implementation, microservices 160-168 may be assigned to a minimum number of cluster nodes for supporting the distributed service. Thus, in this example, microservice allocator 234 assigns microservices to cluster nodes 260 and 270, but because cluster nodes 260 and 270 are sufficient for supporting the distributed service, does not assign any microservices to cluster node 250.

In an example implementation, the partitions and/or assignments of microservice allocator 234 may be evaluated to ensure each cluster node includes enough resources to support its assigned microservices. Where it is determined that a cluster node does not include enough resources, a new cluster node may be added and the partitioning process may be re-executed including the additional cluster node. This process may be repeated until it is determined that each cluster node of the distributed service includes enough resources to support its assigned microservices.

Scheduler extension 230 may further include a configuration executor 236. Configuration executor 236 may execute the assignments of microservices to cluster nodes as determined by microservice allocator 234. In an example implementation, executing the assignments may include updating instructions of job input specification 202 to reflect the assignment of microservices 160-168 to cluster nodes 260 and 270. The updated job specification 202 may be submitted to the relevant container orchestration platform. In an example implementation, the container orchestration platform (not shown) may include node affinity data to guide the container orchestration platform to place the microservices in the correspondingly assigned cluster nodes. Configuration executer 236 may further adjust the microservice placement policies of the container orchestration platform to enforce new placement decisions.

In an example implementation, configuration executer 236 may adjust job specification 202 and/or any microservice placement policy of the respective container orchestration platform periodically. In an example implementation, configuration executer 236 may adjust job specification 202 responsive to a communication pattern change, and thus a partition change of SCA graph 300 or to an otherwise change in the allocation of microservices to cluster nodes as assigned by microservice allocator 234. In an example, a cool-down policy may be enforced to avoid overreaction and to otherwise reduce disruption to the distributed service such that new microservice allocations are not implemented until an amount of time after the last execution of configuration executer 236. In an example, configuration executer 236 may compare a current proposed placement decision of microservice allocator 234 with an already implemented assignment of microservices, and, where the placement decisions are the same and/or similar beyond a threshold, configuration executor may defer any job specification 202 or microservice placement policy adjustment until a next time period.

Figure 4:
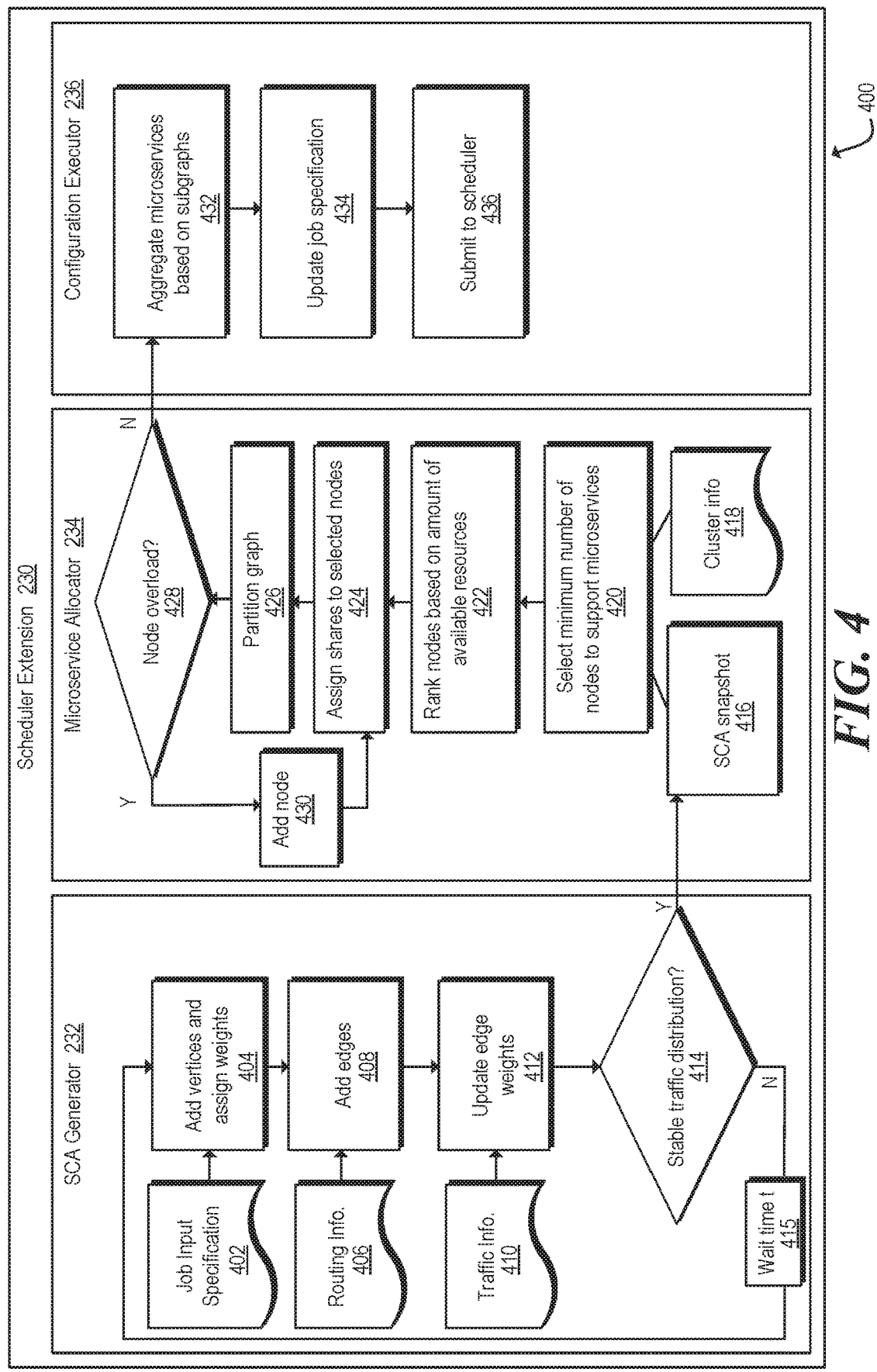
FIG. 4 is a block diagram of an example system for co-locating microservices.

FIG. 4 is a block diagram of an example system 400 for co-locating microservices. System 400 may include similar components to system 200, including scheduler extension 230 with SCA generator 232, microservice allocator 234, and configuration executer 236. SCA generator 232 may, as described above, generate a Service Communication Abstraction (SCA) graph. Specifically, SCA generator may receive the specification and/or configuration information of microservices from job input specification 402. Job input specification 402 may include a list of microservices to be employed by the distributed service and specifications of the microservices; specifically, job input specification 402 may include the computational resources for supporting each of the microservices. At block 404, SCA generator may add a vertex to the SCA graph representing each of the list of microservices. SCA generator may further assign a weight to each of the vertices corresponding to the resources for supporting the respective microservice.

At block 408, SCA generator may add edges to the SCA graph representing the communication pattern of the microservices, as determined from routing information 406. Specifically, SCA generator 232 may generate the edges from the routing and/or telemetry data collected by sidecar proxies monitoring the microservices of the distributed service as further described herein. In an example implementation, an edge may be generated between microservices in direct communication.

At block 412, traffic information 410 collected by the sidecar proxies may be used to update weights of the various edges. In an example implementation, each edge weight may correspond to a latency of communication between microservices, and/or a rate of communication between the microservices.

It may be determined at block 414 whether a stable statistical distribution of the routing and/or telemetry data was derived from the routing and traffic data, 406 and 410 respectively, monitored over a period of time. A snapshot of an SCA for a stable statistical distribution of the input traffic may be taken at block 416 by microservice allocator 234, where the traffic distribution is determined to be stable. In an example, the statistical distribution may be considered stable where a variation of a normalized histogram of the routing and/or telemetry data is below a threshold for a predefined period of time. If the traffic distribution is determined not to be stable at block 414, the process may wait a period of time 415 for additional routing information 406 and traffic information 410 to be collected, followed by a return to block 414.

At block 420, microservice allocator 234 may determine a minimum number of nodes for supporting the microservices of the distributed service. This determination may be made, for example, using the microservice specifications, i.e. the vertex weights, of the SCA snapshot, and cluster information 418, which may detail a list of available cluster nodes and resources available for each of the cluster nodes. For example, it may be determined from the cluster information that each of cluster nodes 260, and 270 of FIG. 2 support 1.5 CPU and 1.5 GB, and that cluster node 250 supports 1.0 CPU and 1.0 GB. It may therefore be determined that two cluster nodes is the minimum number of nodes to support each of microservices 160-168.

At block 422, microservice allocator 234 may rank the nodes based on an amount of available resources. For example, cluster nodes 260 and 270 may be ranked higher than cluster node 250 because cluster nodes 260 and 270 have a greater number of available resources than cluster node 250. At block 424, microservice allocator 234 may assign shares to the selected cluster nodes, in this example cluster nodes 260 and 270. At block 426, microservice allocator 236 may partition the SCA graph, as illustrated at example FIG. 3B.

At block 428, microservice allocator 234 may determine whether there is a node overload, i.e. whether a cluster node is assigned a greater number of microservices than are resources available. A cluster node is added, e.g. cluster node 250, where a node overload is determined, followed by a return to block 424. Where there is determined to be no overload, microservice allocator 234 may pass the node assignments to configuration executer 236.

Configuration executer 236 may aggregate microservices according to the assignments designated by microservice allocator 234. Configuration executor 236, at block 434, may further update the distributed service job specification as described above. Configuration executor 236 may submit, at block 436, the updates to the scheduler, e.g. scheduler 244 of FIG. 2.

Figure 5:
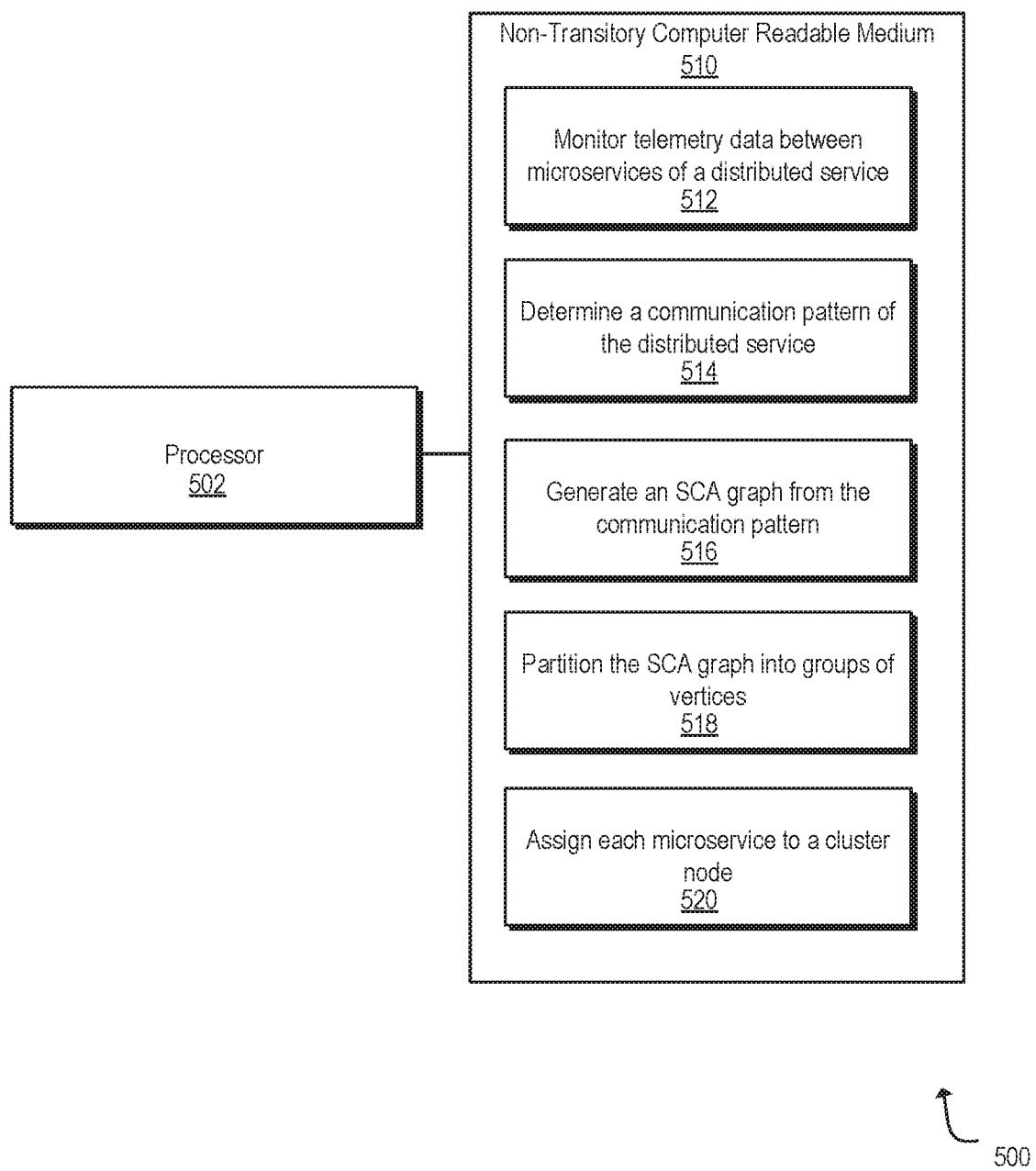
FIG. 5 is a block diagram of an example non-transitory computer readable medium having instructions for assigning microservices to a cluster node.

FIG. 5 is a block diagram 500 of an example non-transitory computer readable medium 510 having instructions thereon that, when executed by processor 502, assign microservices to a cluster node. Non-transitory computer readable medium 510 may be implemented in a single device or distributed across devices. Likewise, processor 502 may represent any number of physical processors capable of executing instructions stored by computer readable medium 510.

As used herein, a "computer readable medium" may be any electronic, magnetic, optical, or other physical storage apparatus to contain or store information such as executable instructions, data, and the like. For example, any computer readable medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer readable medium described herein may be non-transitory. In examples described herein, a computer readable medium or media may be part of an article (or article of manufacture).

An article or article of manufacture may refer to any manufactured single component or multiple components.

Processor 502 may be a central processing unit (CPU), graphics processing unit (GPU), microprocessor, and/or other hardware device suitable for retrieval and execution of instructions stored in computer readable medium 510. Processor 502 may fetch, decode, and execute program instructions 512-520, and/or other instructions. Similarly, processor 502 may fetch, decode, and execute program instructions 512-520. As an alternative or in addition to retrieving and executing instructions, processor 502 may include at least one electronic circuit comprising a number of electronic components for performing the functionality of instructions 512-520, and/or other instructions. Similarly, processor 502 may include at least one electronic circuit comprising a number of electronic components for performing the functionality of instructions 512-520, and/or other instructions.

Instructions 512, when executed, may monitor telemetry data between microservices of a distributed service. In an example implementation, the telemetry data may be monitored via a sidecar proxy deployed at a dataplane of the distributed service. The telemetry data may include traffic data between microservices, e.g. latency data, rate of communication data between microservices, etc.

Instructions 514, when executed, may determine a communication pattern of the distributed service. For instance, a stable statistical distribution of the routing and/or telemetry data may be derived from traffic data monitored over a period of time. The communication pattern may be represented as a distribution, illustrating, for example, the average route of traffic between microservices, the frequency rate of communication between microservices, etc.

Instructions 516, when executed, may generate an SCA graph from the communication pattern. As described above with reference to FIG. 3A, the SCA graph may include vertices representing the microservices of the distributed service. Each vertex may be weighted according to the specifications of a respective microservice. For example, the weight may correspond to the CPU and memory consumption of the respective microservice.

The SCA graph may also include weighted edges to illustrate the communication pattern of the distributed service. The weighted edges may correspond to, for example, the frequency rate of communication between microservices, the average latency across microservices, the direction of traffic across microservices, etc.

Instructions 518, when executed, may partition the SCA graph into groups of vertices. As described in relation the FIG. 3B, the SCA graph may, in some examples, be partitioned such that the total weight of edges across different partitions is minimized. In some example implementations, each partition may include at least one vertex, i.e. at least one microservice.

Instructions 520, when executed, may assign each microservice of the distributed service to a cluster node. In an example implementation, each microservice of a same partition may be assigned to a same cluster node. Additionally, microservices may, in some examples, be assigned to a minimum number of cluster nodes for supporting the distributed service.

Figure 6:
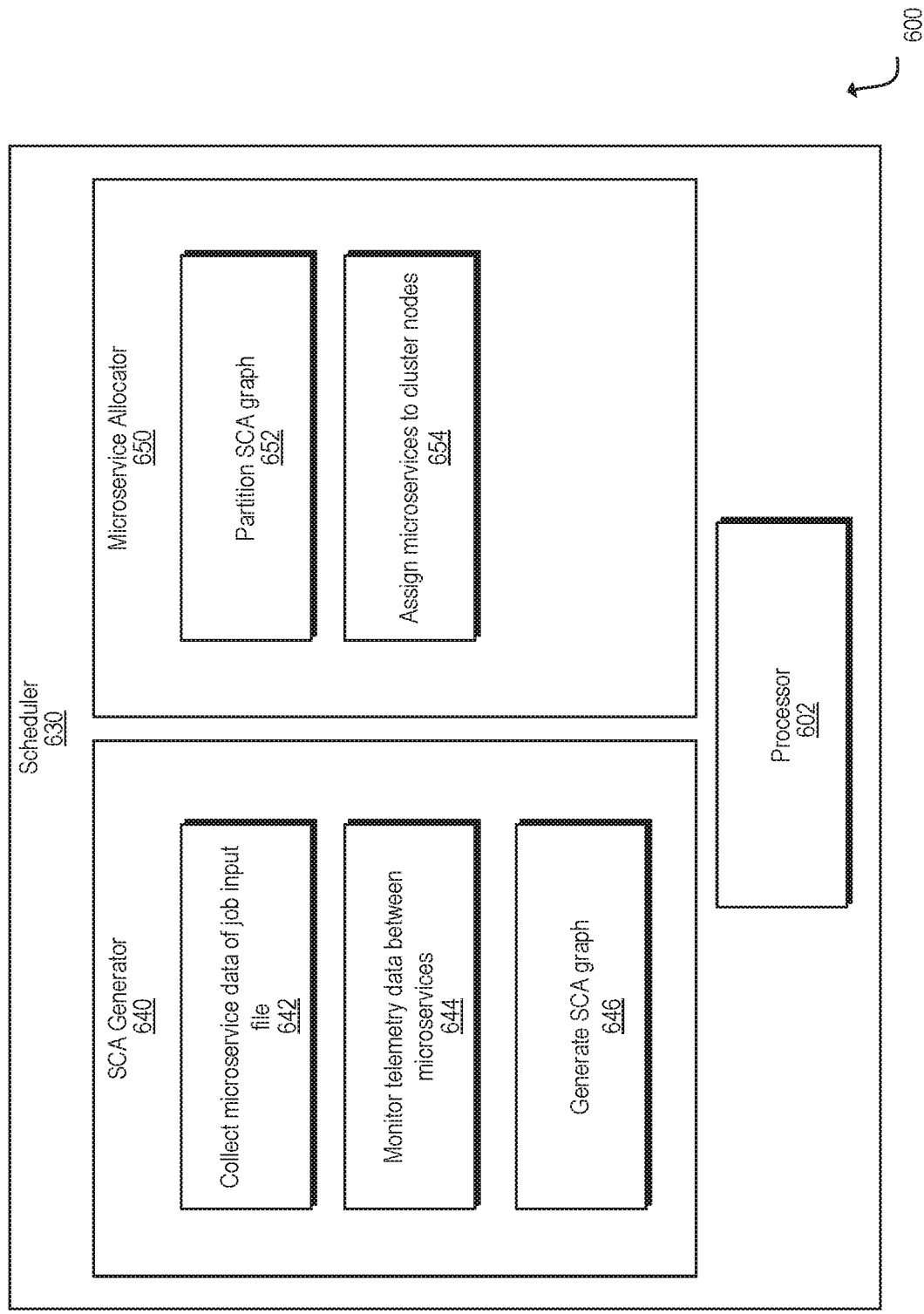
FIG. 6 is a block diagram 600 illustrating an example scheduler 630 for assigning microservices to cluster nodes.

FIG. 6 is a block diagram 600 illustrating an example scheduler 630 for assigning microservices to cluster nodes. Scheduler 630 may include Service Communication Abstraction (SCA) generator 640 and microservice allocator 650. Scheduler 630 and/or either of SCA generator 640 or microservice allocator 650 may be implemented by one or more engines which may be any combination of hardware and programming to implement the functionalities of the engine(s). In examples described herein, such combinations of hardware and programming may be implemented in a number of different ways. For example, the programming for the engines may be processor executable instructions, e.g. 642-646 and 652-654 stored on at least one non-transitory computer readable storage medium and the hardware for the engines may include at least one processing resource 602 to execute those instructions. In some examples, the hardware may also include other electronic circuitry to at least partially implement at least one of the engine(s). In some examples, the at least one computer readable medium may store instructions that, when executed by the at least one processing resource 602, at least partially implement some or all of the engine(s). In such examples, a computing device may include the at least one computer readable storage medium storing the instructions and the at least one processing resource 602 to execute the instructions. In other examples, the engine may be implemented by electronic circuitry.

Instructions 642 may, when executed, collect microservice data of a job input specification, e.g. job input specification 202 of FIG. 2, for a distributed service. The job input specification may include a list of microservices to be employed by the distributed service and specifications of the microservices; specifically, the job input specification may include the computational resources for supporting each of the microservices.

Instructions 644, when executed, may monitor telemetry data between microservices of the distributed service. In an example implementation, the telemetry data may be collected from a sidecar proxy deployed at a data plane of the distributed service. The telemetry data may include traffic data between microservices, e.g. latency data, rate of communication data between microservices, etc.

Instructions 646, when executed, may generate a Service Communication Abstraction (SCA) graph. As described above with reference to FIG. 3A, the SCA graph may include vertices representing the microservices of the distributed service. Each vertex may be weighted according to the specifications of a respective microservice. For example, the weight may correspond to the CPU and memory consumption of the respective microservice.

The SCA graph may also include weighted edges to illustrate the communication pattern of the distributed service. The weighted edges may correspond to, for example, the frequency rate of communication between microservices, the average latency across microservices, the direction of traffic across microservices, etc. In an example, SCA generator 640 may pass the generated SCA graph to microservice allocator 650.

Instructions 652, when executed, may partition the SCA graph. Specifically, the SCA graph may be partitioned into groups of vertices. As described in relation the FIG. 3B, the SCA graph may, in some examples, be partitioned such that the total weight of edges across different partitions is minimized. In some example implementations, each partition may include at least one vertex, i.e. at least one microservice.

Instructions 654, when executed, may assign each microservice of the distributed service to a cluster node. In an example implementation, each microservice of a same partition may be assigned to a same cluster node. Additionally, microservices may, in some examples, be assigned to a minimum number of cluster nodes for supporting the distributed service.

Figure 7:
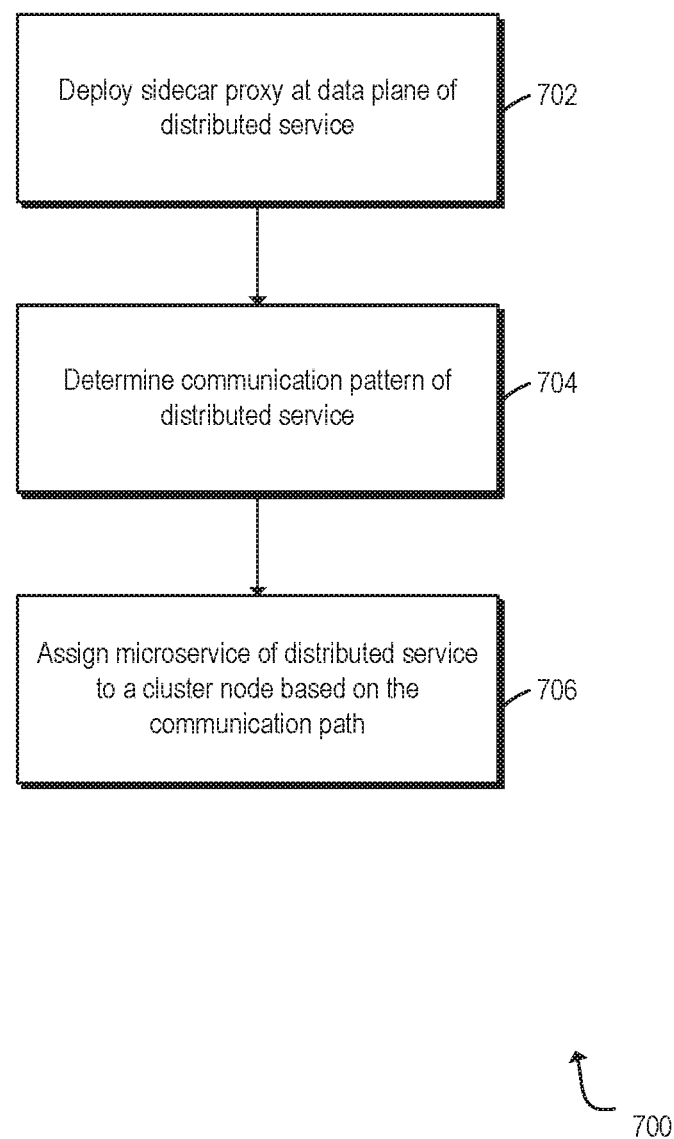
FIG. 7 is a flowchart illustrating a method 700 for assigning a microservice to a cluster node.

FIG. 7 is a flowchart illustrating a method 700 for assigning a microservice to a cluster node. Although execution of method 700 is described below with reference to system 200 of FIG. 2, this is for explanatory purposes and other suitable components for execution of method 700 may be utilized. Additionally, the components for executing method 700 may spread among multiple devices. Method 700 may be implemented in the form of executable instructions stored on a computer readable storage medium and/or in the form of electronic circuitry, e.g. hardware. In some examples, steps of method 700 may be executed substantially concurrently or in a different order than shown in FIG. 7. In some examples, method 700 may include more or less steps than are shown in FIG. 7. In some examples, some of the steps of method 700 may, at certain times, be ongoing and/or may repeat.

At block 702 a sidecar proxy may be deployed. The sidecar proxy may be deployed at a data plane of a distributed service as further described above. In an example implementation, the sidecar proxy may collect routing and/or telemetry data derived from communications between a service mesh and microservice instances of the distributed service respectively. In another example, the sidecar proxy may collect routing and/or telemetry data from communications between microservice instances. In an example implementation, the sidecar proxy may transmit the collected routing and/or telemetry data to a monitor, e.g. monitor 134 of FIG. 2. Depending on the deployment configuration, the example sidecar proxy may provide any number of additional functionalities for the microservices of the distributed service respectively, including health checking, load balancing, routing, etc.

At block 704, a communication pattern of the distributed service may be determined from the telemetry data. The communication pattern may be, for example, a stable statistical distribution of the routing and/or telemetry data. The communication pattern may be represented as a distribution, illustrating, for example, the average route of traffic between microservices, the frequency rate of communication between microservices, etc.

At block 706, a microservice of a distributed service may be assigned to a cluster node. The microservice of the distributed service may be assigned to the cluster node based on the communication pattern determined at block 704 and/or according to any of the assignment policies described above.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method comprising:
collecting, by a Service Communication Abstraction (SCA) graph generator executing on a hardware processor, microservice data of a job input specification of a distributed service;
monitoring, via a sidecar proxy, telemetry data between microservices of the distributed service;
generating, by the SCA graph generator, an SCA graph from the job input specification data and the telemetry data, wherein the SCA graph includes vertices representing the microservices derived from the job input specification data, and edge weights between the vertices representing a communication pattern of the distributed service, the communication pattern derived from the telemetry data;
partitioning, by a microservice allocator executing on the hardware processor, the SCA graph into partitions, wherein each partition of the partitions includes at least one of the vertices; and
assigning, by the microservice allocator, the microservices to cluster nodes, wherein microservices of a same partition of the partitions are assigned to a same cluster node.

2. The method of claim 1, wherein the partitioning includes:
ranking a network of available cluster nodes based on an amount of available resources on each cluster node; and
selecting a minimum number of cluster nodes to support the microservices of the distributed service, wherein the SCA is partitioned such that microservices having a greatest edge weight among the microservices of the distributed service that do not exceed the amount of available resources on the cluster node are allocated to the partition.

3. The method of claim 2, further comprising:
identifying the microservices of the distributed service from the job input specification; and
assigning each of the identified microservices a weight corresponding to a resource specification of each microservice.

4. The method of claim 3, further comprising:
re-determining the communication pattern responsive to an update of the job input specification; and
reassigning each microservice of the distributed service to the cluster node based on a change in the communication pattern.

5. The method of claim 1, wherein the communication pattern is a snapshot of a stable statistical distribution of the telemetry data monitored over a period of time.

6. The method of claim 1, wherein the edge weights between the vertices correspond to a function of latency between the microservices represented by the vertices and the rate of traffic between the microservices represented by the vertices.

7. The method of claim 1, wherein each of the vertices is assigned a weight corresponding to a resource specification of a represented microservice, and wherein the partitions are dependent on the weight of the vertices and the edge weights between the vertices.

8. A scheduler comprising:
a Service Communication Abstraction (SCA) graph generator, the SCA graph generator configured to:
collect microservice data of a job input specification of a distributed service;
monitor, via a sidecar proxy, telemetry data between microservices of the distributed service;
generate an SCA graph from the job input specification data and the telemetry data, wherein the SCA graph includes vertices representing the microservices derived from the job input specification data, and edge weights between the vertices representing a communication pattern of the distributed service, the communication pattern derived from the telemetry data; and
a microservice allocator, the microservice allocator configured to:
partition the SCA graph into partitions, wherein each partition of the partitions includes at least one of the vertices; and assign the microservices to cluster nodes, wherein microservices of a same partition of the partitions are assigned to a same cluster node.

9. The scheduler of claim 8, wherein the communication pattern is a snapshot of a stable statistical distribution of the telemetry data monitored over a period of time.

10. The scheduler of claim 8, further comprising a configuration executor, the configuration executor to execute the assignments of the microservices to the cluster nodes.

11. The scheduler of claim 10, wherein execution of the assignments includes updating instructions of the job input specification to reflect the microservice assignments to the cluster nodes.

12. The scheduler of claim 8, wherein the edge weights between the vertices correspond to a function of latency between the microservices represented by the vertices and the rate of traffic between the microservices represented by the vertices.

13. The scheduler of claim 8, wherein each of the vertices is assigned a weight corresponding to a resource specification of a represented microservice, and wherein the partitions are dependent on the weight of the vertices and the edge weights between the vertices.

14. A non-transitory computer readable medium comprising instructions executable by a processor for microservice assignment, the computer-readable storage medium comprising instructions to:

monitor, via a sidecar proxy, telemetry data between microservices of a distributed service;

determine, from the telemetry data, a communication pattern of the distributed service;

generate an Service Communication Abstraction (SCA) graph from the communication pattern, the communication pattern derived from the telemetry data and including vertices representing the microservices of the distributed service;

partition the SCA graph into groups of vertices; and assign each microservice of the distributed service to a cluster node, wherein microservices of a same partition are assigned to a same cluster node.

15. The non-transitory computer readable medium of claim 14, wherein partitioning the SCA graph further comprises:

ranking a network of available cluster nodes based on an amount of available resources on each cluster node; and selecting a minimum number of cluster nodes to support the microservices of the distributed service, wherein the SCA is partitioned such that microservices having a greatest edge weight among the microservices of the distributed service that do not exceed the amount of available resources on the cluster node are allocated to the partition.

16. The non-transitory computer readable medium of claim 15, further comprising:

identifying the microservices of the distributed service from the job input specification; and assigning each of the identified microservices a weight corresponding to a resource specification of each microservice.

17. The non-transitory computer readable medium of claim 16, further comprising:

re-determining the communication pattern responsive to an update of the input job input specification; and reassigning each microservice of the distributed service to the cluster node based on a change in the communication pattern.

* * * * *